(12) United States Patent
Dupuis

(10) Patent No.: US 11,216,009 B2
(45) Date of Patent: Jan. 4, 2022

(54) ROBOT COORDINATION IN A SHARED WORKSPACE

(71) Applicant: Intrinsic Innovation LLC, Mountain View, CA (US)

(72) Inventor: Jean-Francois Dupuis, San Francisco, CA (US)

(73) Assignee: Intrinsic Innovation LLC, Mountain View, CA (US)

(*) Notice: Subject to any disclaimer, the term of this patent is extended or adjusted under 35 U.S.C. 154(b) by 84 days.

(21) Appl. No.: 16/452,384

(22) Filed: Jun. 25, 2019

(65) Prior Publication Data

US 2019/0391597 A1 Dec. 26, 2019

Related U.S. Application Data

(60) Provisional application No. 62/689,351, filed on Jun. 25, 2018.

(51) Int. Cl.
| | |
|---|---|
| *B25J 9/16* | (2006.01) |
| *G05D 1/02* | (2020.01) |
| *B25J 9/00* | (2006.01) |

(52) U.S. Cl.
CPC .......... *G05D 1/0289* (2013.01); *B25J 9/0084* (2013.01); *B25J 9/1666* (2013.01)

(58) Field of Classification Search
CPC ...... B25J 9/1666; B25J 9/0084; B25J 9/1605; B25J 9/1682; B25J 9/1664; G05D 1/0289; G05B 2219/39001; G05B 2219/40518
USPC .............................................. 700/248; 901/1
See application file for complete search history.

(56) References Cited

U.S. PATENT DOCUMENTS

| | | | |
|---|---|---|---|
| 2007/0294029 A1 | 12/2007 | D'Andrea et al. | |
| 2018/0001472 A1 | 1/2018 | Konidaris et al. | |
| 2018/0164775 A1* | 6/2018 | Crivella | B25J 9/1666 |

(Continued)

FOREIGN PATENT DOCUMENTS

WO WO2017/139613 8/2019

OTHER PUBLICATIONS

PCT International Search Report and Written Opinion in International Appln. No. PCT/US19/39062, dated Sep. 13, 2019, 9 pages.

(Continued)

*Primary Examiner* — Dalena Tran
(74) *Attorney, Agent, or Firm* — Fish & Richardson P.C.

(57) ABSTRACT

Methods, systems, and computer programs stored on computer storage devices, for coordinating movements of robots are disclosed. One of the methods includes, for each robot in a group of robots, identifying a set of tasks assigned to the robot and generating a plurality of candidate motion plans. The method further includes, for each candidate motion plan: (i) generating a 3D model that represents a volume of space through which the robot would move in executing the sequence of motions represented by the candidate motion plan, and (ii) determining a score for the candidate motion plan. The method further includes determining conflicts between candidate motion plans of different robots, selecting a motion plan from the candidate motion plans based on the score for the selected motion plan and the conflicts, and providing the selected motion plans for execution by the group of robots.

20 Claims, 7 Drawing Sheets

(56) References Cited

U.S. PATENT DOCUMENTS

2018/0172450 A1\* 6/2018 Lalonde ............. G01C 21/3453
2019/0346851 A1\* 11/2019 Liu ................. B60W 60/00276

OTHER PUBLICATIONS

Spensieri et al., An Iterative Approach for Collision Free Routing and Scheduling in Multirobot Stations, Apr. 2016, IEEE Xplore, 13 pages.
Pellegrinelli et al., Multi-robot spot-welding cells for car-body assembly: Design and motion planning, ACM Digital Library, Apr. 2017, 20 pages.
PCT International Preliminary Report on Patentability in International Appln. No. PCT/US19/39062, dated Dec. 29, 2020, 7 pages.

\* cited by examiner

ROBOT COORDINATION IN A SHARED WORKSPACE

CROSS-REFERENCE TO RELATED APPLICATION

This application claims priority to U.S. Provisional Application No. 62/689,351, filed on Jun. 25, 2018. The disclosure of the prior application is considered part of and is incorporated by reference in the disclosure of this application.

BACKGROUND

This specification generally describes techniques for planning the movements of robots in a shared workspace and, more specifically, improving motion planning for robots during concurrent task execution.

Robots have facilitated automation of tasks across a range of industries and settings. Some systems have been developed that allow multiple, individually functioning robots to operate concurrently in a shared workspace. The set of robots that share a workspace are said to be part of a common "cell" or "workcell" of robots. A cell in a robotic system can be programmed to execute tasks to achieve a goal, such as the production of an item of manufacture, the assembly of a device, the fabrication of a component, or the inspection of an object. For example, in an automotive assembly line, a cell of robots with articulating arms may surround a chassis of a vehicle and operate in the workspace occupied by the chassis to attach components, apply machining operations (e.g., drilling, spot welding, milling, or grinding one or more portions of the chassis), perform measurements and inspections, or perform a combination of these and other operations. Each robot, for example, may pivot about a base, and may extend from the base with one, two, three, or more articulating segments, thereby allowing it to move and reach a portion or entirety of the shared workspace. The base itself may be fixed, or may move in one or more dimensions, as well. To complete a production goal, robots in the cell may perform individual tasks serially and/or concurrently with other robots. Coordination of the movements and task execution by a cell of robots can be a complex, tedious process.

SUMMARY

In general, this specification discloses systems, methods, devices, and other techniques for improving the operation of robots in a shared workspace. A cell of robots can be programmed to execute tasks related to a common goal, such as completion of a product assembly or fabrication of one or more components. To improve efficiency of the cell's operations, the techniques disclosed herein may be applied to schedule the robots in the cell to perform particular tasks at specific times in a way that enhances one or more characteristics of the cell's operations. Moreover, each robot may be provided with a motion plan that facilitates execution of the robot's tasks, while also allowing the robot to move about the shared workspace and avoid collisions or other interference with other robots in the cell. The system may create virtual models (e.g., three-dimensional models) of the space swept by a robot during or between task executions, and may identify possible interference among the robots by identifying intersections or overlap of the virtual models indicating that two or more robots may attempt to occupy the same space at or around the same time as each other. The system can then adapt the motion plans, or select different motion plans, to avoid interference among the robots.

In further detail, a scheduling system can receive a set of tasks that are to be performed by multiple robots. The scheduling system can assign each individual robot a subset of the tasks that the robot can perform. In some implementations, the scheduling system groups each task in the set of tasks into clusters, such that each task is assigned to exactly one cluster of tasks. The scheduling system then assigns each individual robot one or more of the clusters. The scheduling system can then generate a set of candidate motion plans for each robot, each candidate motion plan representing a different sequence of motions that can be performed by the robot to complete the subset of tasks assigned to the robot. For each candidate motion plan, the scheduling system can generate a 3D model representing the volume of space that a robot would occupy during the execution of the subset of tasks assigned to the robot according to the candidate motion plan. The scheduling system can then determine, for each candidate motion plan, a score that indicate an estimated efficiency of the candidate motion plan. The scheduling system can use the 3D model of each of the candidate motion plans to determine if the robots risk colliding as a result of executing the set of candidate motion plans. After scoring and determining conflicts between candidate motion plans, the scheduling system can select, for each of the multiple robots, a motion plan, chosen from the set of candidate motion plans. The scheduling system selects the motion plans based on the conflicts determined between motion plans and the score determined for each motion plan. The scheduling system can then provide the motion plans to the multiple robots for execution.

In general, a first aspect includes a method for coordinating movements of a workcell of robots configured to operate in a shared workspace, the method comprising: for each robot in the workcell of robots, identifying a set of tasks assigned to the robot; generating multiple candidate motion plans, each candidate motion plan representing a different sequence of motions for the robot to execute in performing the set of tasks; for each candidate motion plan: (i) generating a 3D model that represents a volume of space through which the robot would move in executing the sequence of motions represented by the candidate motion plan, and (ii) determining a score for the candidate motion plan, the score based at least on a characteristic of the sequence of motions represented by the candidate motion plan or a characteristic of the volume of space represented by the 3D model for the motion plan; determining, using the 3D models corresponding to the candidate motions plans of the workcell of robots, conflicts between candidate motion plans of different robots in the workcell of robots; for each robot in the workcell of robots, selecting a motion plan from the multiple candidate motion plans for the robot based on the score for the selected motion plan and determined conflicts between candidate motion plans for the robot and candidate motion plans of other robots; and providing the selected motion plans for execution by the workcell of robots.

In general, in a first aspect, a method for coordinating the movements of a group of robots configured to operate in a shared workspace includes, for each robot in the group of robots, identifying a set of tasks assigned to the robot and generating a group of candidate motion plans, each candidate motion plan representing a different sequence of motions for the robot to execute in performing the set of tasks. For each candidate motion plan, the method further includes (i) generating a 3D model that represents a volume of space through which the robot would move in executing the sequence of motions represented by the candidate motion plan, and (ii) determining a score for the candidate motion plan, the score based at least on a characteristic of the sequence of motions represented by the candidate motion plan or a characteristic of the volume of space represented by the 3D model for the motion plan. The method further includes determining, using the 3D models corresponding to the candidate motions plans of the group of robots, conflicts between candidate motion plans of different robots in the group of robots. The method further includes selecting, for each robot in the group of robots, a motion plan from the group of candidate motion plans for the robot based on the score for the selected motion plan and determined conflicts between candidate motion plans for the robot and candidate motion plans of other robots. The method further includes providing the selected motion plans for execution by the group of robots.

Implementations of the method can include one or more of the following features. For example, the method can further include, for each robot in the group of robots, identifying a group of sets of tasks assigned to the robot, generating a group of candidate motion plans for each set of tasks in the group of sets of tasks, and selecting, for each robot in the group of robots, a motion plan from the group of candidate motion plans for each set of the group of sets of tasks.

Identifying a set of tasks assigned to the robot may include generating a group of clusters of tasks by assigning each task in the set of tasks to one of the multiple clusters, and for each cluster of the multiple clusters, identifying one or more candidate robots from the group of robots to perform the tasks in the cluster.

Generating a group of clusters of tasks by assigning each task in the set of tasks to one of the multiple clusters may include determining an approximate solution to the traveling salesman problem.

In some implementations, a characteristic of the sequence of motions represented by the candidate motion plan includes an estimated duration of time to execute the candidate motion plan. In other implementations, a characteristic of the sequence of motions represented by the candidate motion plan includes an estimated complexity of a path traced by the robot during execution of the motion plan.

A characteristic of the volume of space represented by the 3D model for the motion plan may include the amount of space encompassed by the 3D model.

The method may further include obtaining a workcell volume cost map, the workcell volume cost map describing costs associated with a robot occupying different portions of space in the shared workspace. For each robot in at least a subset of the group of robots and for each candidate motion plan in at least a subset of the group of candidate motion plans for the robot, determining the score for the candidate motion plan may include determining various portions of space that the robot would move through in executing the sequence of motions represented by the candidate motion plan, determining, using the workcell volume cost map, costs associated with the robot moving through the various portions of space, and determining the score for the candidate motion plan based on the costs associated with the robot moving through the various portions of space.

In some implementations, the group of candidate motion plans meet a minimum diversity requirement between a particular motion plan in the group of candidate motion plans and an alternative motion plan not in the group of candidate motion plans.

In some implementations, the minimum diversity requirement measures a difference between an amount of space represented by a 3D model for the particular motion plan and an amount of space represented by a 3D model for the alternative motion plan. The minimum diversity requirement measures a difference between an estimated duration of time to complete the particular motion plan and an estimated duration of time to complete the alternative motion plan. Generating a group of candidate motion plans may include generating a first group of motion plans and sampling motion plans from the first group of motion plans for inclusion in the group of candidate motion plans based on the minimum diversity requirements.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Some implementations of the subject matter disclosed herein can, in certain instances, achieve one or more of the following advantages. The scheduling system described herein can be used to coordinate the movement of multiple robots executing tasks in a common workspace so as to avoid collisions between the multiple robots. The scheduling system may allow robots to occupy a smaller workspace without the need to position the robots far enough apart that they do not risk collisions with neighboring robots. The scheduling system can also determine a cost associated with the robot occupying various portions of the common workspace, and generate a motion plan that restricts a robot from occupying areas that may cause scheduling conflicts with another robot. By generating motion plans according to the techniques described herein, the scheduling system can also allow the robots to conserve energy and decrease the overall time the robots spend executing tasks. Moreover, possible interferences (e.g., collisions) among two or more robots can be detected during the planning stage in a computationally efficient manner by identifying intersections among 3D models representing the regions of space swept by the robots during their respective motions.

In addition, the scheduling system can reduce the amount of time required to schedule the movement of multiple robots, compared to the scheduling time required by a conventional, human-programmed approach. For example, while a human-programmed approach can require weeks to generate a motion plan, the time required for the scheduling system to generate the same motion plan can be on the order of hours. Therefore, the scheduling system allows for greater flexibility with regard to the number and type of robots in a workcell because robots can be added or removed from the workcell without requiring a substantial amount of time to reschedule the robots of the modified workcell.

DETAILED DESCRIPTION

Figure 1:
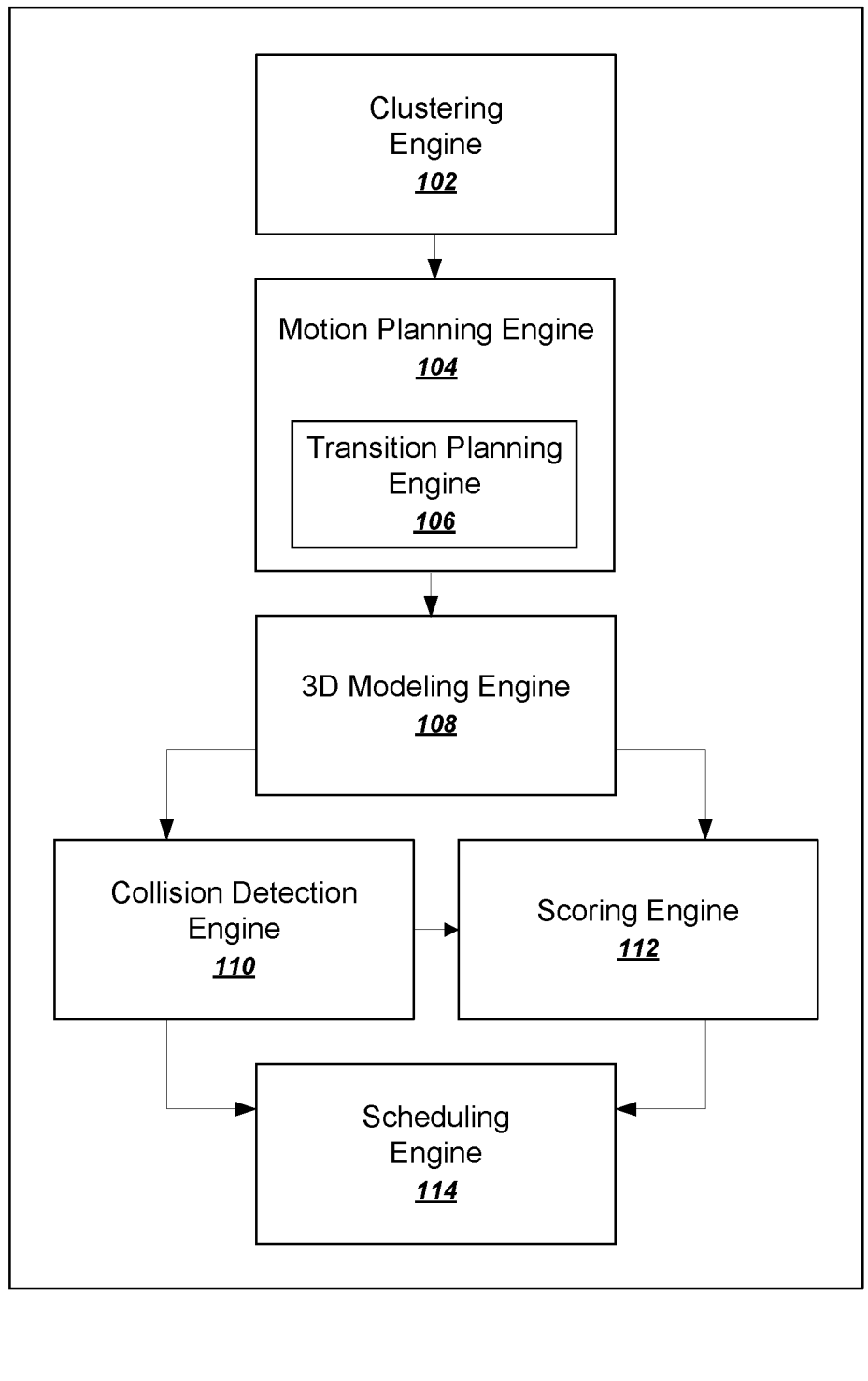
FIG. 1 is a block diagram of a scheduling system for a robotic system.

FIG. 1 shows a block diagram of a scheduling system 100. The scheduling system 100 includes a clustering engine 102, a motion planning engine 104 that includes a transition planning engine 106, a motion swept volume engine 108, a collision detection engine 110, a scoring engine 112, and a scheduling engine 114. Arrows connecting components of the scheduling system 100 indicate a communicative coupling between the components.

The clustering engine 102 is configured to receive a set of tasks that can be performed by a group of robots and group the tasks into clusters. Each task can be assigned to exactly one cluster. Following the generation of the clusters, the clustering engine 102 can label each cluster as feasible by a given robot. In other words, for each robot and cluster pair, the clustering system 102 can determine whether the robot can perform the tasks of the cluster. If the robot is not able to perform at least one task of a cluster, e.g., if the robot does not possess the hardware or software required to complete the task, then the clustering engine 102 can reject the robot and cluster pair as being infeasible.

As an example, a set of tasks can include riveting components of a car at various locations, where each task represents a riveting operation at a distinct location on the chassis of the car. The clustering engine 102 can receive the set of tasks and group all the riveting operations on the driver's side of the car into a first cluster and all the riveting operations on the passenger's side into a second cluster. The scheduling system 100 can then determine that a robot positioned on the driver's side can perform the riveting operations of the first cluster, but not the second cluster, and that a different robot positioned on the passenger's side can perform the riveting operations of the second cluster, but not the first cluster.

The clustering engine 102 can determine the clusters in a number of ways. As in the above example, the clustering engine 102 can group the tasks into clusters according to their proximity to one another, with tasks that are close to one another being grouped into the same cluster.

As another example, the clustering engine 102 can cluster tasks according to a sequence in which the tasks must be completed. A task precedence constraint is said to exist if a first task must be completed before a second task. The clustering engine 102 can group the first task into a first cluster and the second task into a second cluster and communicate a task precedence constraint that requires the first task be performed before the second task.

As another example, the clustering engine can cluster tasks according to the actions that the tasks require a robot to perform. If a first set of tasks requires the robot to drill a component while and a second set of tasks requires the robot to weld two components together, the clustering engine 102 can determine that the two sets of tasks require different tools. In response, the clustering engine 102 can recognize that the first and second sets of tasks require different tools and therefore, cannot be placed in the same cluster.

In some implementations, the clustering engine 102 determines the clusters by finding an approximate solution to the traveling salesman problem. In some implementations, the scheduling system 100 does not include the clustering engine 102.

The motion planning engine 104 generates candidate motion plans. A motion plan represents a sequence of motions for a robot to execute to perform a set of tasks assigned to the robot. A motion plan can include motions for one or more transitions between clusters of tasks executed by a robot, one or more transitions between tasks of a single cluster, a transition between a starting position of the robot and a cluster of tasks, a transition between a cluster of tasks and an ending position of the robot, or a combination of these. For example, a motion plan can be defined as a path that sequentially connects the following positions or tasks: a starting position of a robot, an initial task in a first cluster of tasks assigned to the robot, a final task in a second cluster of tasks assigned to the robot, and finally, an ending position of the robot.

In some implementations, the motion planning engine 104 receives one or more clusters of tasks feasible by a robot and generates one or more candidate motion plans for the robot. The motion planning engine 104 can generate the candidate motion plans in a number of ways. Like the clustering engine 102, the motion planning engine 104 can determine a sequence in which the tasks must be completed and generate a motion plan with respect to the sequence. As another example, the motion planning engine 104 can determine whether a robot is capable of performing the tasks of a particular motion plan.

In other implementations, the motion planning engine 104 receives one or more clusters generated by the clustering engine 102 and generates multiple motion plans based on multiple ways at least one task of the one or more clusters can be performed. For example, a task could be welding a vertical portion of a vehicle. One way of executing the welding task is starting at the top of the vertical portion and welding downwards, while another way of executing the welding task is starting at the bottom of the vertical portion and welding upwards. The motion planning engine 104 can generate both a downward welding motion plan as well as an upward welding motion plan.

The motion planning engine 104 includes the transition planning engine 106, which is configured to generate transitions. As an example of a transition, prior to performing a task, a robot transitions from a first position (e.g., a home or default position) to a second position in which the robot can perform the task. As an additional example, a transition can represent a path from a last task of a first cluster to a first task of a second cluster. The transition planning engine 106 can receive, from the motion planning engine 104, multiple clusters of tasks and an accompanying sequence of movements that a robot can perform to execute the tasks in the cluster. Using the clusters of tasks and the sequences of movements, the transition planning engine 106 can generate transitions between tasks.

The motion swept volume engine 108 is configured to generate a 3D model that represents the volume of space through which the robot would move in executing the sequence of motions represented by a candidate motion plan. The motion swept volume engine can receive motion plans from the motion planning engine 104 and generate a 3D model corresponding to the motion plans and transitions.

For example, the motion swept volume engine 108 can generate the 3D models can be generated using a generator object, e.g., a triangle mesh, that is moved along a 3D path incrementally. At each increment, the generator is transformed to the location specified by the path. The motion swept volume engine 108 can add triangles to connect the previous instance of the generator to the current instance on the path. The motion swept volume engine 108 can use a culling algorithm to remove connecting triangles that would end up inside the resulting swept volume. Using the culling algorithm can reduce the memory used by the motion swept volume engine 108 and accelerate the generation of the 3D models.

Each 3D model can be generated on a common virtual coordinate system that allows the motion swept volume engine 108 to localize each 3D model in relation to other 3D models. The motion swept volume engine 108 can determine intersections between 3D models as they are added to the common virtual coordinate system.

In some implementations, the motion swept volume engine 108 can control the resolution of the 3D model by adjusting the resolution of the generator object, controlling the time the generator object spends at each increment, or both.

In some implementations, a motion swept volume engine of the scheduling system can receive information related to the size of a robot and all its movable components. From this information, the motion swept volume engine can generate a 3D model that simulates the movement of the robot as it moves through the workspace and executes tasks assigned to it.

In other implementations, the scheduling system can generate the 3D model based on actual movements of the robot. For example, the robot can execute a motion plan to determine a corresponding volume of space for these movements. While executing the movements, the motion swept volume engine can trace the motion of a set of points on the surface of the robot. The motion swept volume engine can then use the paths formed in 3D space by the motion of the set of points to generate a 3D model.

The collision detection engine 110 is configured to detect collisions between robots. The collision detection engine 110 can receive 3D models corresponding to motion plans associated with multiple robots from the motion swept volume engine 108. The collision detection engine 110 can analyze the 3D models of the motion plans to determine whether the volumes of space the models represent intersect with one another. An intersection between 3D models indicates that the robots executing the motion plans corresponding to the 3D models risk colliding with one another.

The scoring engine 112 is configured to score a 3D model corresponding to a motion plan. The scoring engine can receive a 3D model from the 3D model engine and data related to collisions from the collision detection engine 110 and generate a score for the 3D model. The score can indicate, for example, an estimated efficiency associated with a robot that performs the motion plan that corresponds to the 3D model, with higher scores representing more efficient motion plans. In some implementations, a first motion plan associated with a set of tasks can be deemed more efficient than a second motion plan associated with the same set of tasks if a robot executing the first motion plan is able to execute the set of tasks more quickly than the same robot executing the second motion plan. In some implementations, the first motion plan can be deemed more efficient than the second motion plan if the robot is able to execute the first motion plan using less energy than it would expend executing the second motion plan. In addition, the first motion plan can be more efficient than the second motion plan if the robot is able to execute the first motion plan using less time and/or volume than it would use when executing the second motion plan. Criteria on which the scoring engine 112 can determine the scores are discussed below with regard to FIG. 4.

The scheduling engine 114 is configured to schedule a set of tasks for a group of robots in a way that avoids collisions among the robots. The scheduling engine 114 schedules the set of tasks by assigning one or more motion plans to a robot.

FIGS. 2A through 2D are diagrams that illustrate stages of an example process of scheduling a set of tasks to be performed by a group of robots. FIGS. 2A through 2D include a robot 202, 204, and 206.

Figure 2A:
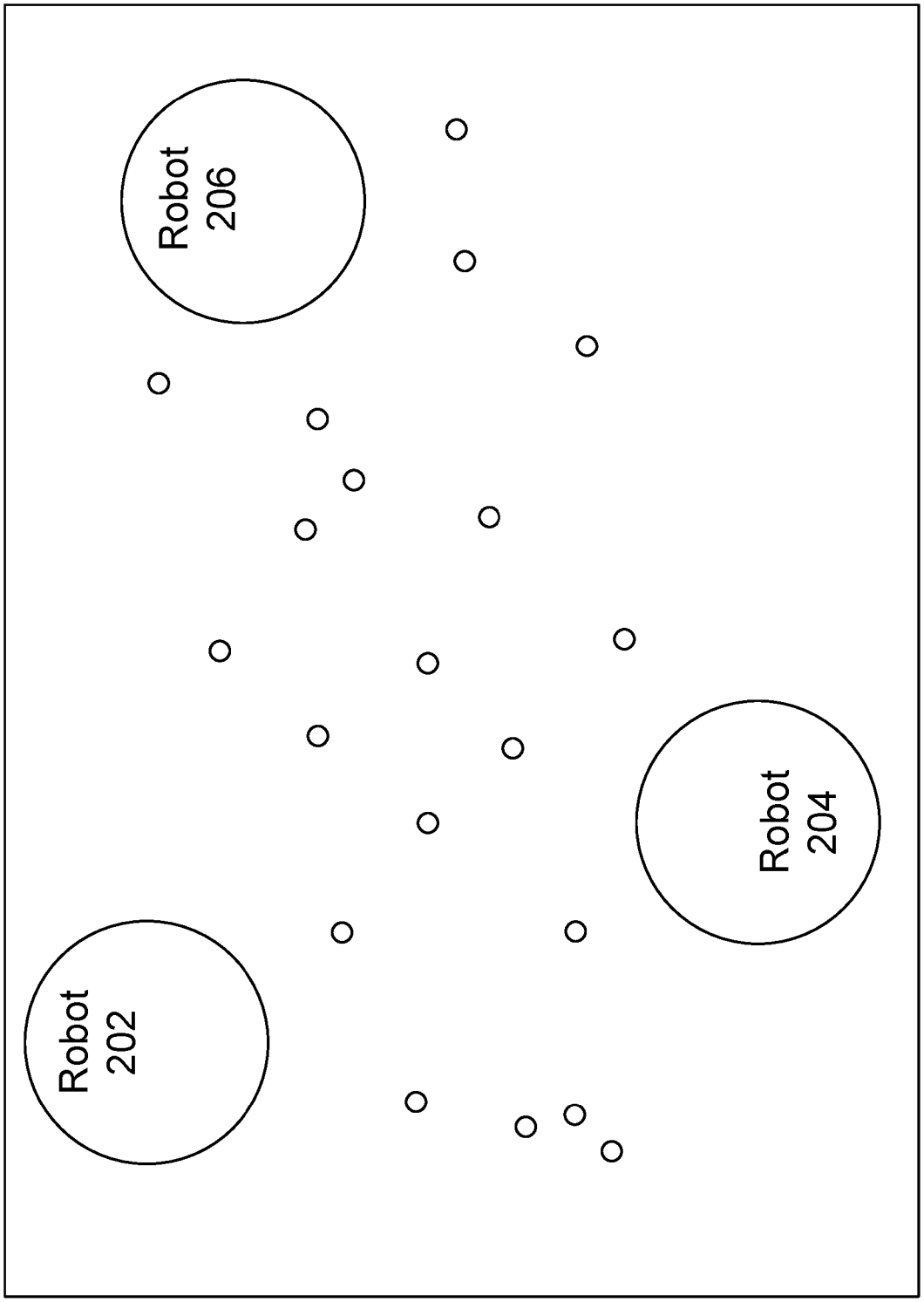
FIG. 2A is a diagram of a set of tasks and a group of robots.

FIG. 2A is a diagram 200A of the set of tasks and the robots 202-206. In this stage, each of the robots 202-206 are in a unique starting position. The robots 202-206 may each have a base that is fixed in position, and one or more segments extending from the base that can pivot and articulate to reach areas of the shared workspace of the robots. Each robot may use one or more tools held at the distal end of the robot to perform tasks such as drilling, welding, heating, milling, riveting, or other specified tasks.

Figure 2B:
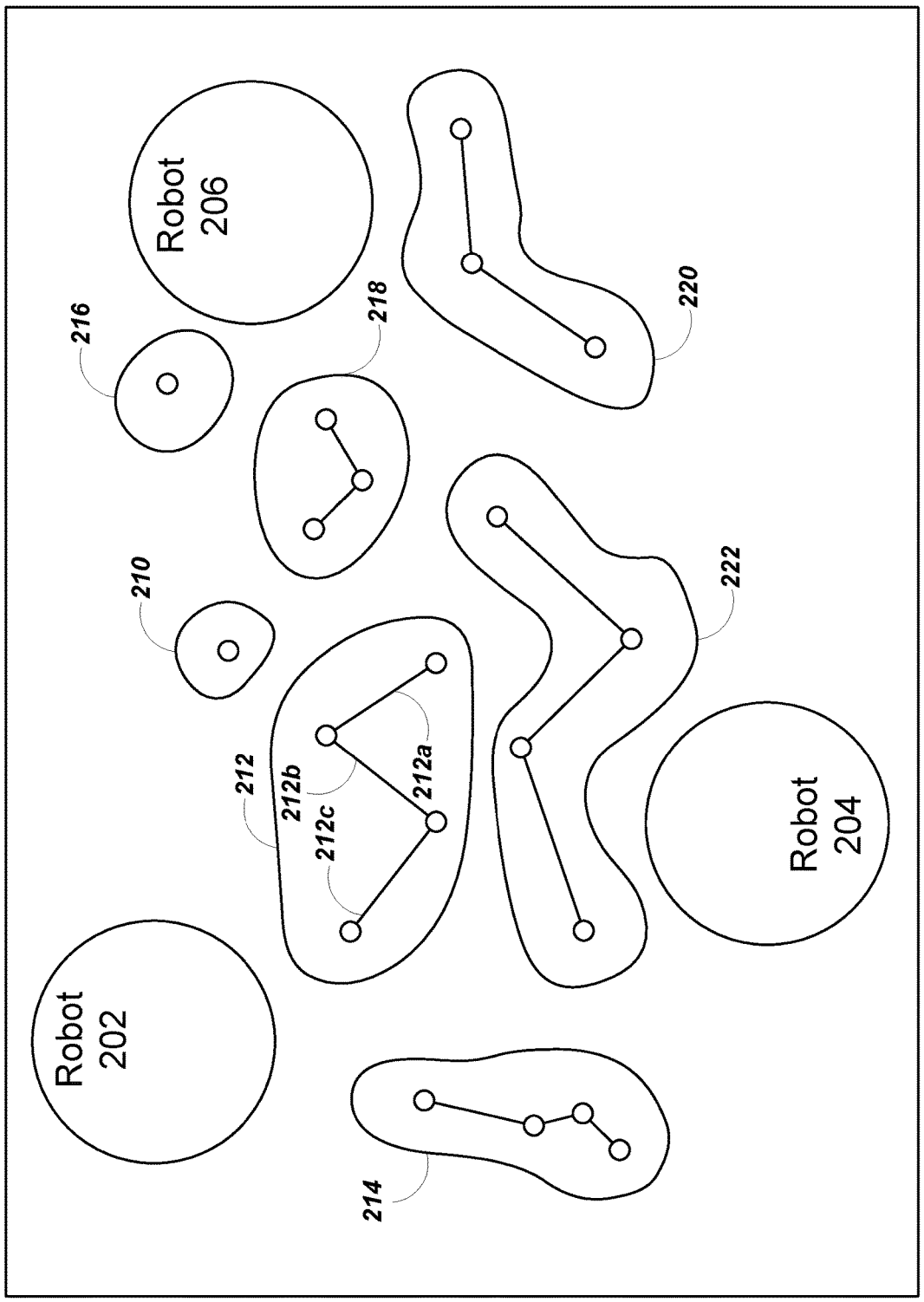
FIG. 2B is a diagram of the set of tasks of FIG. 2A, the robots of FIG. 2A, and multiple sets of tasks assigned to the robots.

FIG. 2B is a diagram 200B of the set of tasks, the robots 202-206, and multiple sets of tasks assigned to the robots 202-206. In this stage, the clustering engine 102 has generated a set of clusters of tasks, including clusters 210, 212, 214, 216, and 218. The clusters are represented by an arbitrary shape that illustrates which tasks are assigned to which cluster. Each of the tasks is assigned to exactly one cluster and the tasks that make up each cluster are assigned to exactly one robot. In the example of FIG. 2B, the motion planning engine 104 assigns the tasks of clusters 210, 212, and 214 to the robot 202. Also in this example, the motion planning engine assigns the tasks of cluster 216, 218, and 220 to the robot 206, and the tasks of the cluster 222 to the robot 204.

Also in this stage, the motion planning engine 104 generates, for each of the clusters, a sequence of motions that the robots 202-206 can execute. The sequence of motions are represented by lines that connect two tasks. Diagram 200B shows motions 212a through 212c that connect tasks of the cluster 212.

Figure 2C:
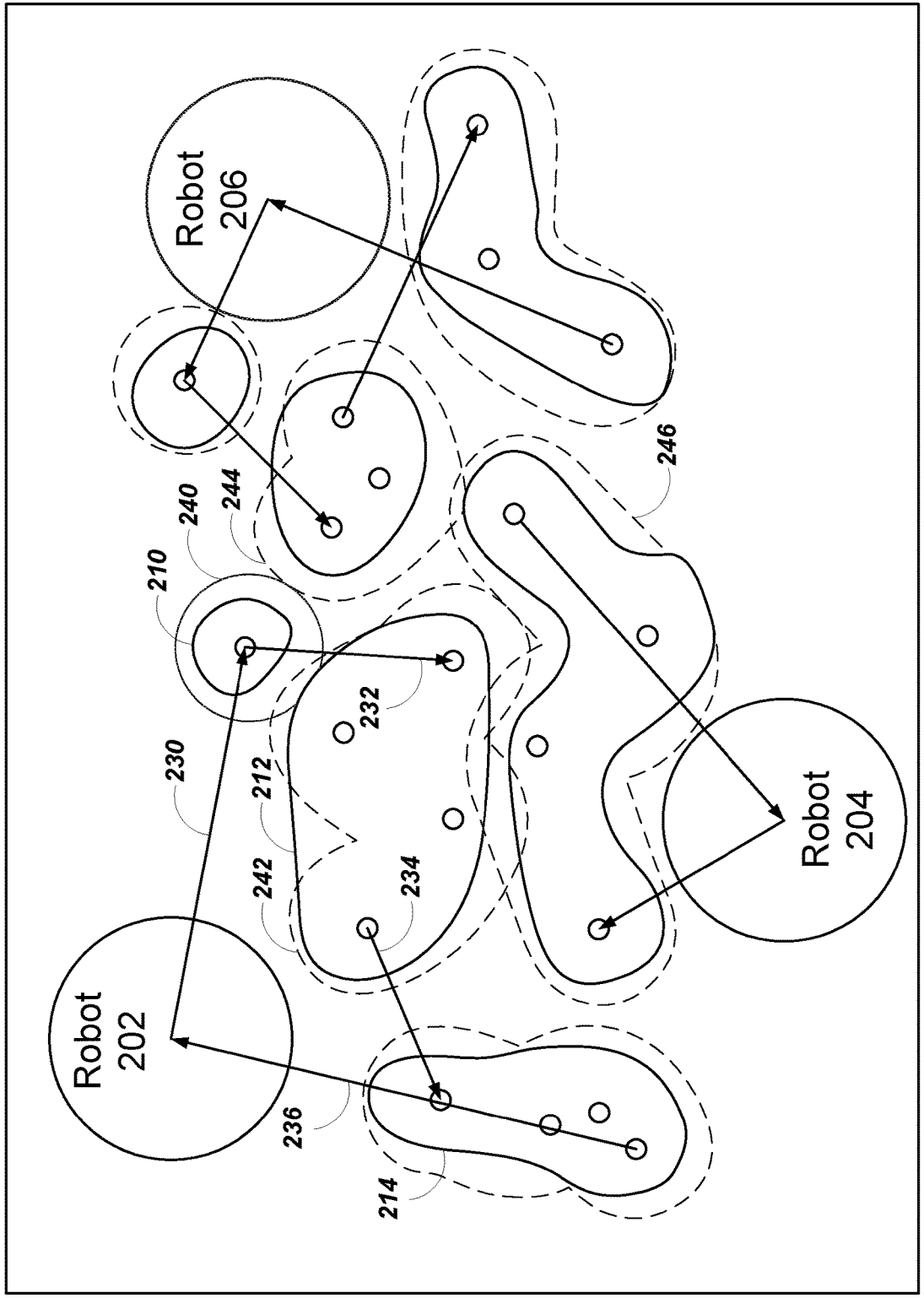
FIG. 2C is a diagram of the set of tasks, the robots of FIGS. 2A-2B, multiple sets of tasks assigned to the robots, multiple transitions for each robot, and multiple representations of 3D models.

FIG. 2C is a diagram 200C of the set of tasks, the robots 202-206, multiple sets of tasks assigned to the robots 202-206, multiple transitions for each robot, and multiple representations of 3D models. In this stage, the transition planning engine 106 can generate a transition between the starting position of each robot and a cluster assigned to the robot. For example, the transition planning engine 106 can generate a transition 230 that connects a starting position of the robot 202 to a task in the cluster 210. The transition planning engine 106 can also generate a transition between each cluster assigned to a particular robot; for example, transition 232 that connects the task in the cluster 210 with a task in the cluster 212 and transition 234 that connects two tasks in the clusters 212 and 214. The transition planning engine 106 can also generate a transition 236 from a task in the cluster 214 to an ending position of the robot 202. In the example of FIG. 2C, the ending position of the robot 202 coincides with the starting position of the robot, although the starting and ending positions of a robot can be two different locations.

The diagram 200C also shows multiple representations of 3D models. Each 3D model generally represents a cumulative region of space that a robot occupies at any point in time during its execution of one or more tasks of a motion plan. Referring to the example of FIG. 2B, the motion swept volume engine 108 can receive the motions 212a through 212c and generate a 3D model 242. Techniques for generating a 3D model from a motion plan are discussed further with regard to FIG. 4.

Figure 2D:
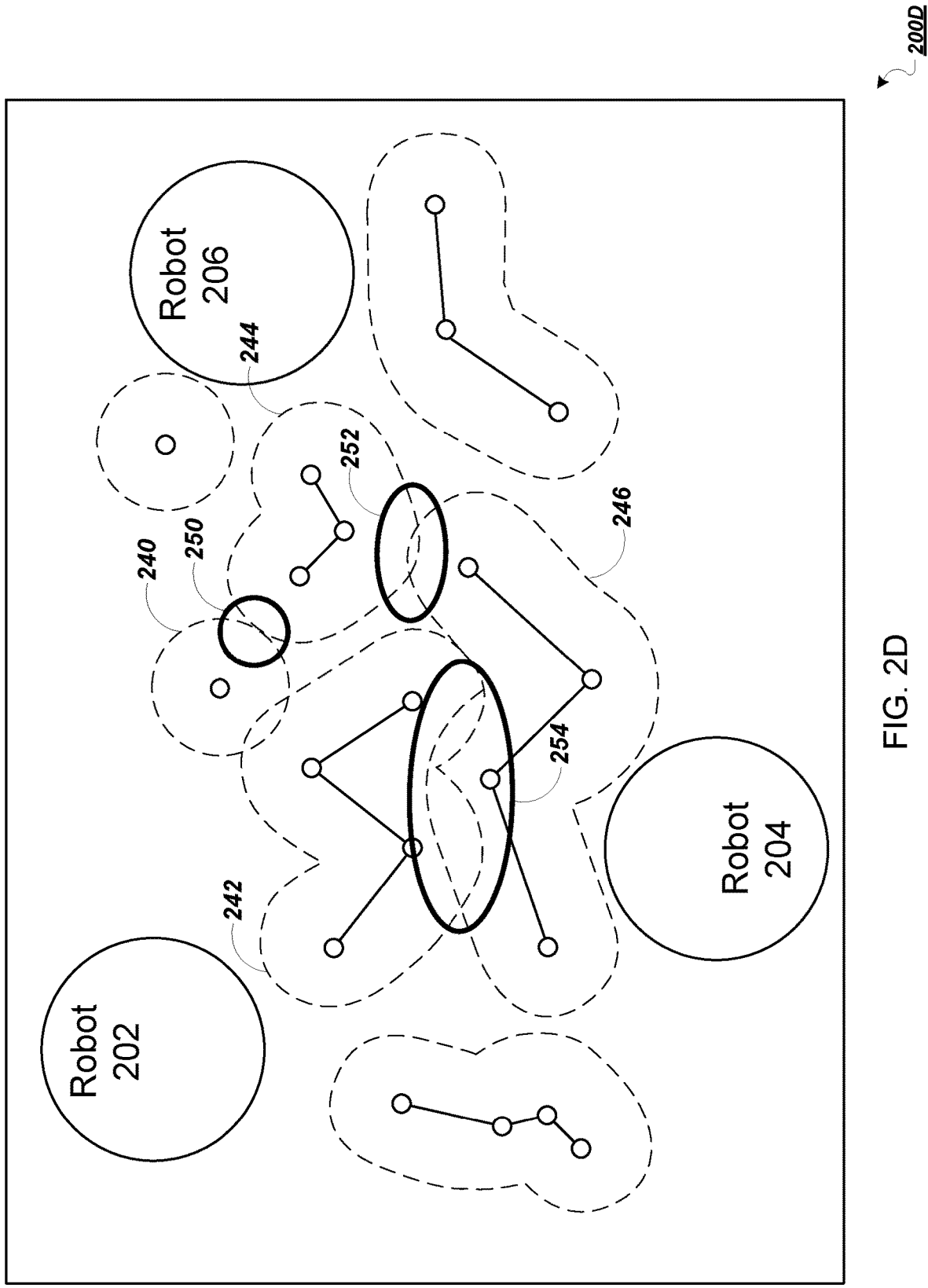
FIG. 2D is a diagram of the robots of FIGS. 2A-2C, the multiple representations of 3D models of FIG. 2C, and an identification of conflicts between the multiple representations of 3D models.

FIG. 2D is a diagram 200D of the robots 202-206, multiple representations of 3D models, and an identification of conflicts between the multiple representations of 3D models. The collision detection engine 110 can receive the 3D models from the motion swept volume engine 108 and determine which 3D models, if any, intersect. For example, the collision detection engine 110 can identify a conflict 250, which results from the intersection of the 3D models 240 and 244. In addition to the conflict 250, the diagram 200D also includes the conflicts 252, and 254, which result from the intersection of the 3D models 244 and 246 and 3D models 242 and 246, respectively.

The 3D model 242 not only intersects with the 3D model 246, but also with the 3D model 240. While the collision detection engine 110 identifies the intersection between the 3D models 242 and 246 as the conflict 254, the engine does not identify the intersection between 3D models 240 and 242 as a conflict because the tasks associated with the 3D models 240 and 242 are all assigned to the same robot, robot 202. Because the tasks are assigned to the robot 202, the robot must complete the tasks associated with one of the 3D models 240 and 242 before proceeding to complete the tasks associated with the other 3D model. That is, the robot 202 does not risk collisions when performing the motion plan associated with 3D models 240 and 242, because the robot will not be working on the tasks associated with the 3D models 240 and 242 at the same time.

Figure 3A:
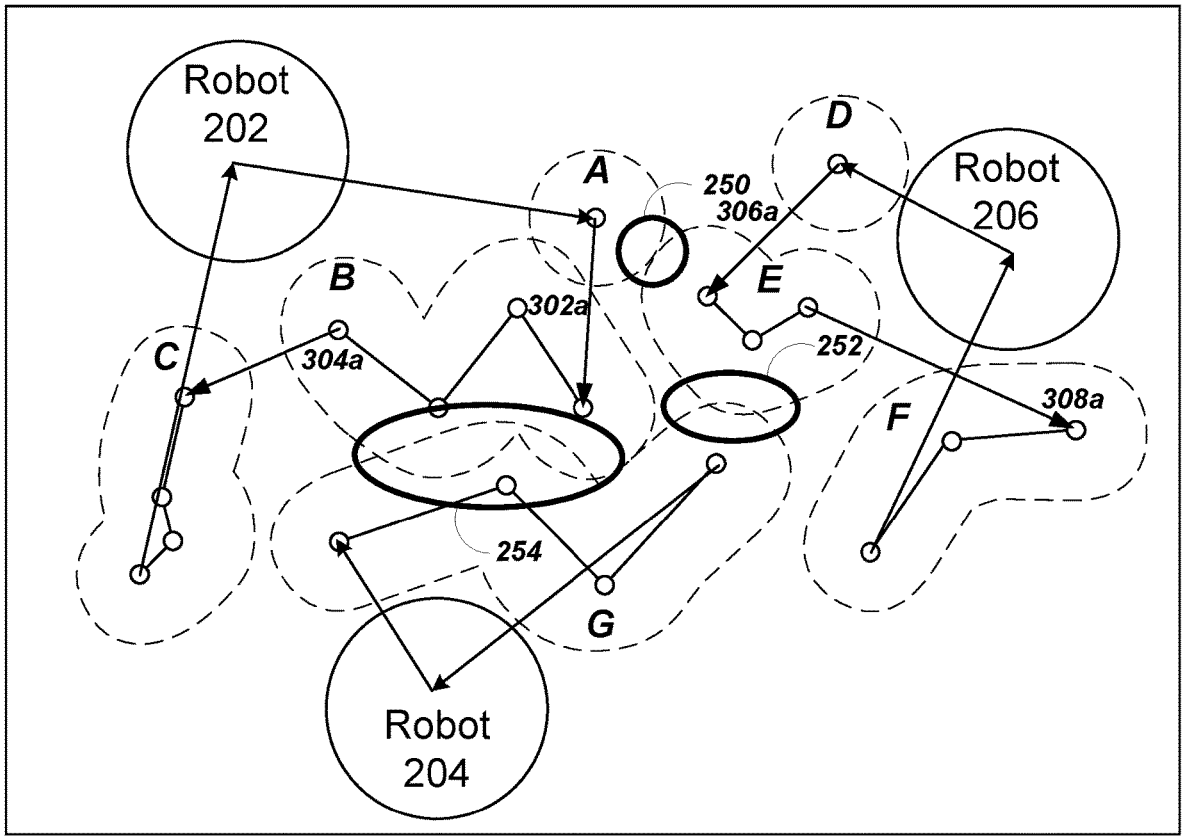
FIG. 3A is a block diagram of the representations of 3D models as shown in FIGS. 2C and 2D and candidate motion plans for the robots of FIGS. 2A-2D.

FIG. 3A is a block diagram 300A of the representations of 3D models as shown in diagrams 200C and 200D and candidate motion plans for the robots 202-206. The 3D models shown in diagram 300A are labeled A through G. As previously mentioned, the tasks associated with the 3D models A, B, and C are assigned to the robot 202, while the tasks associated with the 3D models D, E, and F are assigned to robot 206, and finally, the tasks associated with the 3D model G is assigned to robot 204. The diagram 300A also shows transitions 302a, 304a, 306a, and 308a, as well as the conflicts 250, 252, and 254. Although not labeled the diagram 300A also shows transitions between starting positions of the robots and the 3D models and transitions between ending positions of the robots and the 3D models.

Figure 3B:
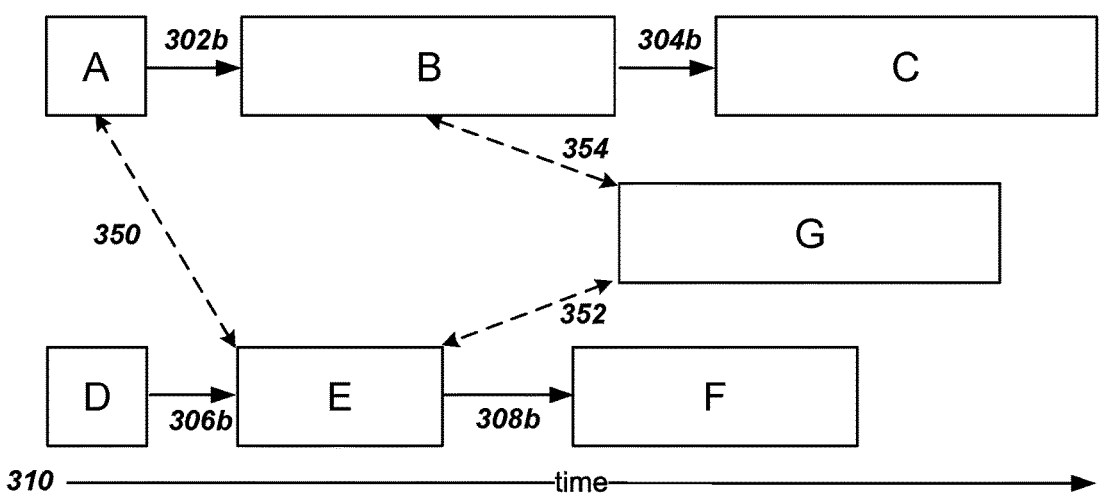
FIG. 3B is a block diagram of representations of 3D models, transitions, and conflicts for the 3D models.

FIG. 3B is a block diagram 300B of representations of 3D models A through G, transitions, and conflicts for the 3D models A through G. Each of the 3D models A through G of the diagram 300A are represented by corresponding blocks A through G in the diagram 300B. The order of the blocks show the temporal order, in relation to a timeline 310, in which a robot executes the tasks associated with the blocks. For example, robot 202 first executes the tasks associated with block A, then block B, and finally, block C. The width of the blocks A through G indicate an estimated amount of time it would take one of the robots 202, 204, or 206 to execute the tasks associated with each block.

The diagram 300B also includes transitions 302b, 304b, 306b, and 308b that correspond to the transitions 302a, 304a, 306a, and 308a shown in the diagram 300A. The diagram 300B also includes the conflicts 350, 352, and 354, which correspond to the conflicts 250, 252, and 254.

The diagram 300B can be used to visualize the conflicts that arise during execution of the motion plans assigned to each robot. The diagram 300B illustrates that a conflict, such as the conflict 350, will not cause a collision unless the task associated with block A is executed by the robot 202 at the same time as the tasks associated with block E are executed by robot 206. As shown in the diagram 300B, the task associated with block A is executed before those associated with block E, resulting in no collision between the robots 202 and 206.

The diagram 300B shows conflict 354, which indicates that the tasks associated with block B conflict with those of the block G. The robots 202 and 204 are likely to collide, because the tasks associated with the block B are executed by the robot 202 at the same time that the robot 204 is executing the tasks associated with the block G. Similarly, the collision detection engine 110 can predict that the robots 204 and 206 will also collide because the tasks associated with the block G and the tasks associated with block E are executed are executed at the same time.

Figure 4:
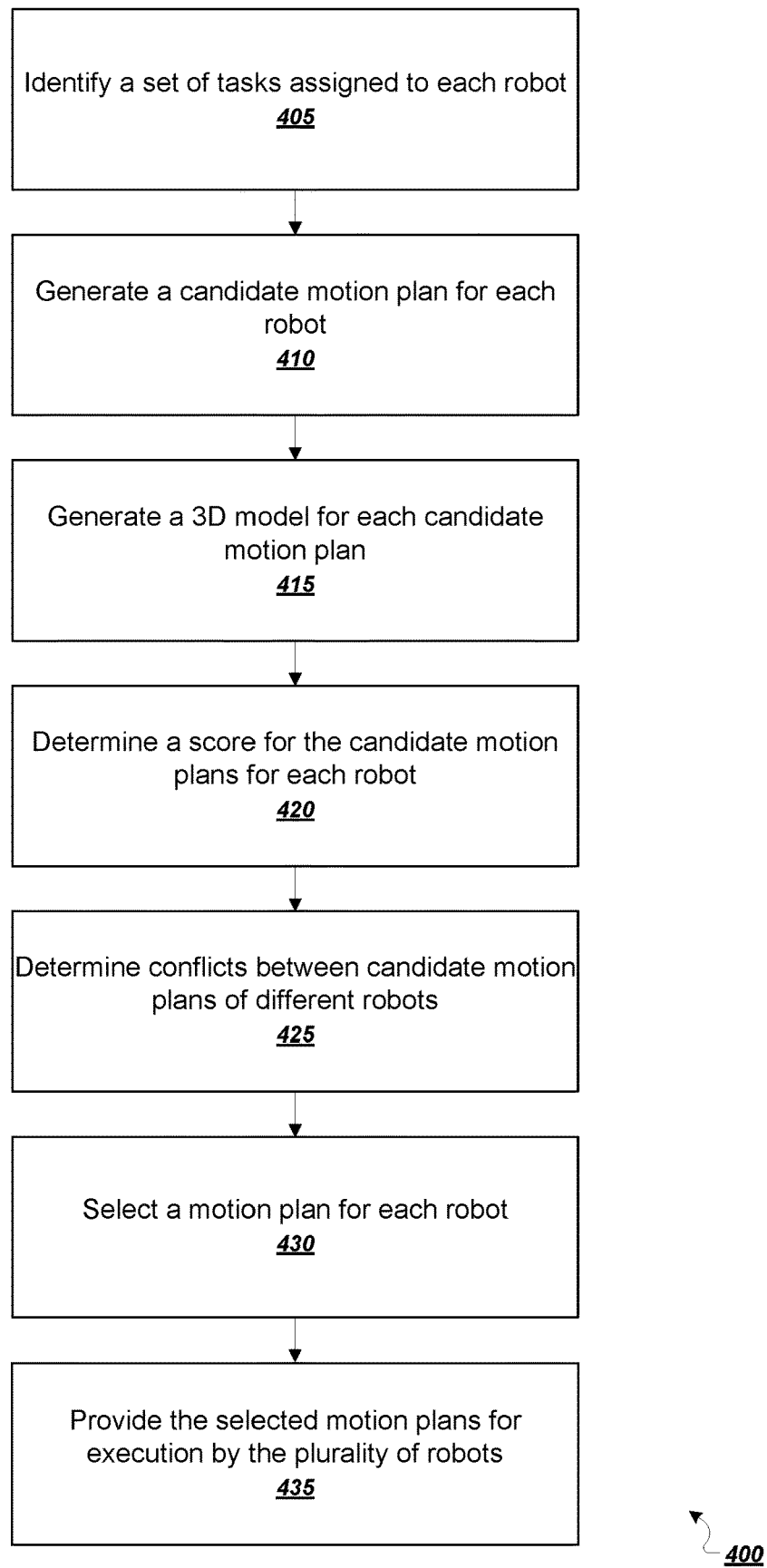
FIG. 4 is a flow diagram for an example process of determining a set of motion plans for a group of robots to execute.

FIG. 4 is a flow diagram for an example process of determining a set of motion plans for a group of robots to execute. The example process can be performed by the scheduling system 100 of FIG. 1.

The scheduling system identifies, for each robot in a workcell of robots, a set of tasks assigned to the robot (405). In some implementations, the scheduling system assigns the set of tasks to the robot. The scheduling system can assign a task to a robot based on a number of considerations. For example, the scheduling system can assign a task to a robot based on the proximity of the robot to the task. As another example, if the robot is the only robot in the workcell of robots that has the appropriate mechanical capabilities to complete the task, then the scheduling system can identify the robot as being uniquely capable of executing the task, and therefore, assign the task to the robot.

In some implementations, the scheduling system generates multiple clusters of tasks by assigning each task in the set of tasks to one of the multiple clusters. Afterwards, the scheduling system can identify, for each cluster of the multiple clusters, one or more candidate robots from the workcell of robots to perform the tasks in the cluster. That is, a clustering engine of the scheduling system can place each task into exactly one cluster, and assign each cluster to exactly one robot.

The scheduling system generates, for each robot in the workcell of robots, a multiple candidate motion plans, each candidate motion plan representing a different sequence of motions for the robot to execute in performing the set of tasks (410). The scheduling system generates the multiple candidate motion plans for each particular robot without considering any additional robots other than the particular robot.

In some implementations, the scheduling system can generate a graph where the set of vertices of the graph are the plurality of tasks, and the set of edges of the graph are movement paths that the robot can make from one task to another. Using this graph, the scheduling system can generate the multiple candidate motion plans using any free motion generator, e.g., a rapidly-exploring random tree (RRT) planner or a probabilistic roadmap (PRM) planner.

The scheduling system generates, for each robot in the workcell of robots and for each candidate motion plan, a 3D model that represents a volume of space through which the robot would move in executing the sequence of motions represented by the candidate motion plan (415).

In some implementations, the scheduling system can generate a workcell volume cost map that can describe a cost associated with a robot moving through the environment of the workcell of robots. For example, a region of space can have a high cost associated with it if the region of space is within a threshold distance to the starting or ending positions of a robot. As another example, a region of space can have a high cost if it is one in which the candidate motion plans of multiple robots pass through during execution of one or more tasks.

As an example, the scheduling system can generate a workcell volume cost map by performing the following actions. The scheduling system can partition the environment of the workcell of robots into voxels of a predetermined size. The scheduling system can then use the 3D model generated for each candidate motion plan in stage 415 to determine a count for each voxel, where the count is a number of candidate motion plans that pass through the space defined by the voxel. For example, the scheduling system can maintain a data structure that records the count for each voxel. The scheduling system can increment the count for a voxel each time a candidate motion plan passes through the voxel. After determining a count for each voxel, the scheduling system can generate a workcell volume cost map in which portions of the environment corresponding to voxels having higher counts are assigned higher costs than those of portions of the environment corresponding to voxels having lower counts.

The scheduling system can determine the portion of space that the robot occupies while executing a candidate motion plan. For example, the scheduling system can determine the portion of space using the 3D model associated with the candidate motion plan. Using the workcell volume cost map, the scheduling system can determine a cost associated with the robot moving through the environment of the workcell. For example, the scheduling system can determine an average cost associated with the volume occupied by the 3D model. The scheduling system can then determine a score for the candidate motion plan using the cost associated with the robot moving through the environment of the workcell.

The scheduling system determines, for each robot in the workcell of robots and for each candidate motion plan, a score for the candidate motion plan, the score based at least on a characteristic of the sequence of motions represented by the candidate motion plan or a characteristic of the volume of space represented by the 3D model for the motion plan (420). The higher the score assigned to a candidate motion plan, the more efficient the candidate motion plan is.

In some implementations, a characteristic of the sequence of motions represented by the candidate motion plan can include an estimated duration of time to complete the candidate motion plan. That is, the scheduling system can estimate the amount of time that a robot may take to execute the candidate motion plan and assign a score based on the time estimate. The scheduling system can then assign lower scores to candidate motion plans that take longer to execute and higher scores to candidate motion plans that take less time to execute.

In some implementations, a characteristic of the sequence of motions represented by the candidate motion plan can include an estimated energy consumption of a robot during execution of the motion plan. For example, the energy consumption of the robot during execution of the motion plan can be directly proportional to the amount of times that the candidate motion plan requires the robot to change direction. Accordingly, if executing a first candidate motion plan requires more energy consumption than executing a second candidate motion plan, the scheduling system can assign a lower score to the first candidate motion plan than to the second candidate motion plan.

In some implementations, a characteristic of the volume of space represented by the 3D model for the motion plan can include the amount of space encompassed by the 3D model. That is, the scheduling system can estimate the volume of space that the candidate motion plan may occupy. The scheduling system can then assign lower scores to candidate motion plans that occupy less volume.

In some implementations, the scheduling system can determine the score based on the workcell volume cost map generated in stage 410. The scheduling system can calculate, using the workcell volume cost map, a cost associated with the candidate motion plan and determine a score based on the cost associated with the candidate motion plan. The scheduling system can then assign lower scores to candidate motion plans that have high costs.

The scheduling system can generate motion plans each having a unique starting or ending pose. A pose of a robot can include the orientation of the robot and the orientation of any tools of the robot. The scheduling system can determine each possible pose that the robot can have at a certain location. One or more constraints imposed on the robot determine whether a motion plan can include a certain pose. For example, a constraint on the available poses at a certain location can be based on the free space within the vicinity of the robot at the location.

In some implementations, the scheduling system can require that the multiple candidate motion plans meet a minimum diversity requirement between a particular motion plan in the multiple candidate motion plans and an alternative motion plan not in the multiple candidate motion plans. For example, the candidate motion plans can include two motion plans that both execute a common task. Each candidate motion plan can include a unique set of poses, e.g., different starting poses, or different ending poses. For the two motion plans to meet a minimum diversity requirement, the two motion plans must be significantly different, e.g., include poses that are significantly different. If the scheduling system determines that the two motion plans do not meet the minimum diversity requirement, then the system can select one to be a candidate motion plan and exclude the other motion plan from being a candidate motion plan.

In some implementations, the minimum diversity requirement specifies a minimum difference between an amount of space represented by one or more 3D models for the particular motion plan and an amount of space represented by one or more 3D models for the alternative motion plan. For example, a motion planning engine can generate an order in which a robot executes example tasks A, B, C and D. A first motion plan can represent a sequence of motions that cause the robot to execute tasks in the order A, B, C, then D. A second motion plan can represent a sequence of motions that cause the robot to execute tasks in the order A, C, B, then D. If the tasks B and C are located close to one another, then the scheduling system can determine that the volume of the one or more 3D models for the first motion plan may not be significantly different from the volume of the one or more 3D models for the second motion plan.

Because the volumes are not significantly different, the scheduling system can include one of either the first or the second motion plans in the multiple candidate motion plans.

As another example, the motion planning engine can generate multiple motion plans that cause a robot to execute example tasks A, B, and C. A first motion plan can represent a sequence of motions that causes the robot to execute tasks in the order A, B, then C, while a second motion plan can represent a sequence that causes the robot to execute the tasks in the order C, B, then A. The first motion plan may take the same amount of time to execute as the second motion plan. Because of this, the scheduling system can determine that the two motion plans are substantially similar, and include one of either the first or the second motion plans in the multiple candidate motion plans.

The scheduling system determines, using the 3D models corresponding to the candidate motions plans of the workcell of robots, conflicts between candidate motion plans of different robots in the workcell of robots (425). A collision detection engine of the scheduling system can receive a set of 3D models and determine whether any of the 3D models occupy the same volume of space, representing a conflict.

The scheduling system selects, for each robot in the workcell of robots, a motion plan from the multiple candidate motion plans for the robot based on the score for the selected motion plan and determined conflicts between candidate motion plans for the robot and candidate motion plans of other robots (430). For example, the scheduling system can identify all candidate motion plans that have a conflict and determine whether the conflict would result in a collision. If the conflicting motion plan would result in a collision, e.g., if, when executing the conflicting motion plan, two or more robots would collide, then the scheduling system can remove the conflicting motion plan from the set of candidate motion plans. After removing conflicting motion plans that would result in a collision, the scheduling system can then select, from the remaining candidate motion plans, a motion plan for each robot according to which motion plan for each robot has the highest score.

The scheduling system provides the selected motion plans for execution by the workcell of robots (435). The scheduling system can send the robots their respective selected motion plans. Each robot can then execute the set of tasks according to its receive motion plan.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

An "engine" as used herein refers to a data processing apparatus (e.g., one or more computers, one or more processors) configured to perform operations. The data processing apparatus can be provided in one or more locations, and can assume a centralized or distributed architecture.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the invention have been described. Other implementations are within the scope of the following claims. For example, the actions recited in the claims may be performed in a different order and still achieve desirable results.

What is claimed is:

1. A method for coordinating movements of a plurality of robots configured to operate in a shared workspace, comprising:
   for each robot in the plurality of robots:
      identifying a set of tasks assigned to the robot;
      generating a plurality of candidate motion plans, each candidate motion plan representing a different sequence of motions for the robot to execute in performing the set of tasks;
   for each candidate motion plan:
      (i) generating a 3D model that represents a volume of space through which the robot would move in executing a sequence of motions represented by the candidate motion plan, and
      (ii) determining a score for the candidate motion plan, the score based at least on a characteristic of the sequence of motions represented by the candidate motion plan or a characteristic of the volume of space represented by the 3D model for the candidate motion plan;
   determining that a conflict occurs between a pair of candidate motion plans for different respective robots, including using respective 3D models for the pair of candidate motion plans to determine that an intersection occurs between respective volumes of space generated for the pair of candidate motion plans for the different respective robots;
   in response, removing, from the plurality of candidate motion plans, one or more of the pair of candidate motion plans having the conflict due to the intersection between the respective volumes of space generated for the pair of candidate motion plans;
   selecting, for each robot in the plurality of robots from candidate motion plans that remain among the plurality of candidate motion plans after removing the one or more of the pair of candidate motion plans having the conflict, a respective candidate motion plan based on the scores computed for the candidate motion plans; and
   scheduling execution of the set of tasks including assigning one or more selected candidate motion plans to each robot of the plurality of robots.

2. The method of claim 1 further comprising:
   for each robot in the plurality of robots:
      identifying a plurality of sets of tasks assigned to the robot;
      generating a plurality of candidate motion plans for each set of tasks in the plurality of sets of tasks; and
      selecting, for the robot, a motion plan from the plurality of candidate motion plans for each set of the plurality of sets of tasks.

3. The method of claim 1 wherein identifying a set of tasks assigned to each robot of the plurality of robots comprises:
   generating a plurality of clusters of tasks by assigning each task in the set of tasks to one of the plurality of clusters; and
   for each cluster of the plurality of clusters, identifying one or more candidate robots from the plurality of robots to perform the tasks in the cluster.

4. The method of claim 3 wherein generating the plurality of clusters of tasks by assigning each task in the set of tasks to one of the plurality of clusters comprises determining an approximate solution to the traveling salesman problem.

5. The method of claim 1 wherein the characteristic of the sequence of motions represented by the candidate motion plan includes an estimated duration of time to execute the candidate motion plan.

6. The method of claim 1 wherein the characteristic of the sequence of motions represented by the candidate motion plan includes an estimated complexity of a path traced by a corresponding robot during execution of the candidate motion plan.

7. The method of claim 1 wherein the characteristic of the volume of space represented by the 3D model for the candidate motion plan includes an amount of space encompassed by the 3D model.

8. The method of claim 1, further comprising:
obtaining a workcell volume cost map, the workcell volume cost map describing costs associated with a robot occupying different portions of space in the shared workspace; and
wherein, for each robot in at least a subset of the plurality of robots and for each candidate motion plan in at least a subset of the plurality of candidate motion plans for the robot, determining the score for the candidate motion plan comprises:
determining various portions of space that the robot would move through in executing the sequence of motions represented by the candidate motion plan;
determining, using the workcell volume cost map, costs associated with the robot moving through the various portions of space; and
determining the score for the candidate motion plan based on the costs associated with the robot moving through the various portions of space.

9. The method of claim 1 wherein the plurality of candidate motion plans meet a minimum diversity requirement between a particular motion plan in the plurality of candidate motion plans and an alternative motion plan not in the plurality of candidate motion plans.

10. The method of claim 9 wherein the minimum diversity requirement measures a difference between an amount of space represented by a 3D model for the particular motion plan and an amount of space represented by a 3D model for the alternative motion plan.

11. The method of claim 9 wherein the minimum diversity requirement measures a difference between an estimated duration of time to complete the particular motion plan and an estimated duration of time to complete the alternative motion plan.

12. The method of claim 9 wherein generating the plurality of candidate motion plans comprises:
generating a first plurality of motion plans; and
sampling motion plans from the first plurality of motion plans for inclusion in the plurality of candidate motion plans based on the minimum diversity requirement.

13. One or more non-transitory computer-readable media having instructions stored thereon that, when executed by one or more processors, cause the one or more processors to perform operations comprising:
for each robot in a plurality of robots configured to operate in a shared workspace:
identifying a set of tasks assigned to the robot;
generating a plurality of candidate motion plans, each candidate motion plan representing a different sequence of motions for the robot to execute in performing the set of tasks;
for each candidate motion plan:
(i) generating a 3D model that represents a volume of space through which the robot would move in executing a sequence of motions represented by the candidate motion plan, and
(ii) determining a score for the candidate motion plan, the score based at least on a characteristic of the sequence of motions represented by the candidate motion plan or a characteristic of the volume of space represented by the 3D model for the candidate motion plan;
determining that a conflict occurs between a pair of candidate motion plans for different respective robots, including using respective 3D models for the pair of candidate motion plans to determine that an intersection occurs between respective volumes of space generated for the pair of candidate motion plans for the different respective robots;
in response, removing, from the plurality of candidate motion plans, one or more of the pair of candidate motion plans having the conflict due to the intersection between the respective volumes of space generated for the pair of candidate motion plans;
selecting, for each robot in the plurality of robots from candidate motion plans that remain among the plurality of candidate motion plans after removing the one or more of the pair of candidate motion plans having the conflict, a respective candidate motion plan based on the scores computed for the candidate motion plans; and
scheduling execution of the set of tasks including assigning one or more selected candidate motion plans to each robot of the plurality of robots.

14. The computer-readable media of claim 13 wherein the operations further comprise:
for each robot in the plurality of robots:
identifying a plurality of sets of tasks assigned to the robot;
generating a plurality of candidate motion plans for each set of tasks in the plurality of sets of tasks; and
selecting, for the robot, a motion plan from the plurality of candidate motion plans for each set of the plurality of sets of tasks.

15. The computer-readable media of claim 13 wherein identifying a set of tasks assigned to each robot of the plurality of robots comprises:
generating a plurality of clusters of tasks by assigning each task in the set of tasks to one of the plurality of clusters; and
for each cluster of the plurality of clusters, identifying one or more candidate robots from the plurality of robots to perform the tasks in the cluster.

16. The computer-readable media of claim 13 wherein the characteristic of the sequence of motions represented by the candidate motion plan includes an estimated duration of time to execute the candidate motion plan or an estimated complexity of a path traced by a corresponding robot during execution of the candidate motion plan.

17. The computer-readable media of claim 13 wherein the characteristic of the volume of space represented by the 3D model for the candidate motion plan includes an amount of space encompassed by the 3D model.

18. The computer-readable media of claim 13, wherein the operations further comprise:
obtaining a workcell volume cost map, the workcell volume cost map describing costs associated with a robot occupying different portions of space in the shared workspace; and
wherein, for each robot in at least a subset of the plurality of robots and for each candidate motion plan in at least a subset of the plurality of candidate motion plans for the robot, determining the score for the candidate motion plan comprises:
- determining various portions of space that the robot would move through in executing the sequence of motions represented by the candidate motion plan;
- determining, using the workcell volume cost map, costs associated with the robot moving through the various portions of space; and
- determining the score for the candidate motion plan based on the costs associated with the robot moving through the various portions of space.

19. The computer-readable media of claim 13 wherein the plurality of candidate motion plans meet a minimum diversity requirement between a particular motion plan in the plurality of candidate motion plans and an alternative motion plan not in the plurality of candidate motion plans.

20. A system for coordinating movements of a plurality of robots configured to operate in a shared workspace, the system comprising:
- one or more computers; and
- one or more computer-readable media having instructions stored thereon that, when executed by the one or more computers, cause the one or more computers to perform operations comprising:
    - for each robot in the plurality of robots:
        - identifying a set of tasks assigned to the robot;
        - generating a plurality of candidate motion plans, each candidate motion plan representing a different sequence of motions for the robot to execute in performing the set of tasks;
        - for each candidate motion plan:
            - (i) generating a 3D model that represents a volume of space through which the robot would move in executing a sequence of motions represented by the candidate motion plan, and
            - (ii) determining a score for the candidate motion plan, the score based at least on a characteristic of the sequence of motions represented by the candidate motion plan or a characteristic of the volume of space represented by the 3D model for the candidate motion plan;
    - determining that a conflict occurs between a pair of candidate motion plans for different respective robots, including using respective 3D models for the pair of candidate motion plans to determine that an intersection occurs between respective volumes of space generated for the pair of candidate motion plans for the different respective robots;
    - in response, removing, from the plurality of candidate motion plans, one or more of the pair of candidate motion plans having the conflict due to the intersection between the respective volumes of space generated for the pair of candidate motion plans;
    - selecting, for each robot in the plurality of robots from candidate motion plans that remain among the plurality of candidate motion plans after removing the one or more of the pair of candidate motion plans having the conflict, a respective candidate motion plan based on the scores for the candidate motion plans; and
    - scheduling execution of the set of tasks including assigning one or more selected candidate motion plans to each robot of the plurality of robots.

\* \* \* \* \*